United States Patent
Eurlings et al.

(10) Patent No.: US 10,828,556 B2
(45) Date of Patent: Nov. 10, 2020

(54) DICE RECOGNITION DEVICE AND METHOD OF RECOGNIZING DICE

(71) Applicant: ARRANGED BVBA, Bilzen (BE)

(72) Inventors: Martin Eurlings, Bilzen (BE); Joris Vaes, Eigenbilzen (BE)

(73) Assignee: ARRANGED BVBA, Bilzen (BE)

( * ) Notice: Subject to any disclaimer, the term of this patent is extended or adjusted under 35 U.S.C. 154(b) by 89 days.

(21) Appl. No.: 16/077,637

(22) PCT Filed: Sep. 13, 2016

(86) PCT No.: PCT/EP2016/071601
§ 371 (c)(1),
(2) Date: Aug. 13, 2018

(87) PCT Pub. No.: WO2017/140385
PCT Pub. Date: Aug. 24, 2017

(65) Prior Publication Data
US 2019/0046863 A1     Feb. 14, 2019

(30) Foreign Application Priority Data

Feb. 16, 2016  (EP) .................................... 16156018
Apr. 25, 2016  (EP) .................................... 16166788

(51) Int. Cl.
*A63F 3/00*     (2006.01)
*G07F 17/32*    (2006.01)
(Continued)

(52) U.S. Cl.
CPC ........ *A63F 3/00157* (2013.01); *A63F 9/0406* (2013.01); *G06F 3/017* (2013.01);
(Continued)

(58) Field of Classification Search
CPC ............. G07F 17/3202; G07F 17/3216; G07F 17/322; G07F 17/329; A63F 9/04;
(Continued)

(56) References Cited

U.S. PATENT DOCUMENTS

| 6,609,710 B1 * | 8/2003 | Order ........................ A63F 9/04 273/148 R |
| 7,360,762 B2 | 4/2008 | Itagaki et al. |

(Continued)

FOREIGN PATENT DOCUMENTS

| WO | 02066926 A1 | 8/2002 |
| WO | 2006003366 A1 | 1/2006 |
| WO | 2010002840 A2 | 1/2010 |

OTHER PUBLICATIONS

Techopedia, "Flatbed Scanner", Dec. 28, 2015 (Year: 2015).*
(Continued)

*Primary Examiner* — Michael A Cuff
(74) *Attorney, Agent, or Firm* — Workman Nydegger

(57) ABSTRACT

A device for assisting in electronic gaming, comprises a flatbed scanning device having a scanning surface. The scanning surface is arranged for throwing a die or dice thereon, and the flatbed scanning device is configured for scanning instantaneously an image of the scanning surface. The device also comprises a processor configured for receiving scanning information regarding the image of the scanning surface upon which a die or dice are thrown and programmed for deriving, based on the image, data regarding the dice thrown.

20 Claims, 8 Drawing Sheets

(51) Int. Cl.

| | |
|---|---|
| *A63F 9/04* | (2006.01) |
| *G06T 7/50* | (2017.01) |
| *G06F 3/01* | (2006.01) |
| *G06K 9/20* | (2006.01) |
| *A63F 9/24* | (2006.01) |

(52) U.S. Cl.
CPC ......... *G06K 9/2018* (2013.01); *G06K 9/2036* (2013.01); *G06T 7/50* (2017.01); *G07F 17/322* (2013.01); *G07F 17/3213* (2013.01); *G07F 17/3241* (2013.01); *A63F 9/04* (2013.01); *A63F 2009/2425* (2013.01); *A63F 2009/2435* (2013.01); *A63F 2300/532* (2013.01)

(58) Field of Classification Search
CPC .............. A63F 9/0402; A63F 3/00157; A63F 2009/2442; A63F 2009/2444; A63F 2009/2445; A63F 2300/532; G06T 7/50; G06T 7/70; G06K 9/20; G06K 9/2018; G06K 9/2027; G06K 9/2036
USPC ........................................................ 463/29
See application file for complete search history.

(56) References Cited

U.S. PATENT DOCUMENTS

| | | | |
|---|---|---|---|
| 7,365,031 B2 | 4/2008 | Swallow et al. | |
| 7,859,526 B2 | 12/2010 | Konicek | |
| 2003/0067110 A1 | 4/2003 | Mancuso | |
| 2005/0221886 A1* | 10/2005 | Itagaki | A63F 9/04 463/22 |
| 2008/0158144 A1 | 7/2008 | Schobben et al. | |
| 2008/0217851 A1 | 9/2008 | Colton | |
| 2010/0032896 A1* | 2/2010 | Berlec | A63F 9/0402 273/146 |
| 2010/0062851 A1* | 3/2010 | Kido | G07F 17/32 463/31 |
| 2010/0124964 A1* | 5/2010 | Kishi | A63F 9/0468 463/16 |
| 2011/0165923 A1* | 7/2011 | Davis | A63F 9/24 463/1 |
| 2013/0225254 A1* | 8/2013 | Pececnik | G07F 17/326 463/17 |
| 2014/0036168 A1 | 2/2014 | Ludwig | |
| 2014/0159308 A1 | 6/2014 | Kishi | |
| 2015/0062461 A1 | 3/2015 | Tallal et al. | |
| 2016/0012671 A1* | 1/2016 | Alsip | G07F 17/3227 463/22 |
| 2018/0111042 A1* | 4/2018 | Bergant | A63F 9/0406 |

OTHER PUBLICATIONS

International Search Report from PCT Application No. PCT/EP2016/071601, dated Nov. 25, 2016.

Nakamoto, "Bitcoin: A Peer-to-Peer Electronic Cash System," retrieved from https://bitcoin.org/bitcoin.pdf, May 24, 2009, 9 Pages.

* cited by examiner

DICE RECOGNITION DEVICE AND METHOD OF RECOGNIZING DICE

FIELD OF THE INVENTION

The invention relates to the field of systems and methods for assisting in gaming. More particularly, the present invention relates to systems and methods for reading dices for electronic gaming, such as for example online gaming.

BACKGROUND OF THE INVENTION

We are living in a period where people live more alone, use more electronic media for their social contacts like Facebook, YouTube and thus also for gaming. Board games are getting more popular; many of them require dice throwing as the game deciding parameter.

Yahtzee as an example, a game in which five dice are thrown to make up certain combination of eyes on the dice. Conventionally, the verification of combinations is done visually by one participant or moderator of the game, who is present at the same location as the other players.

Online betting and casino games, are increasingly popular, mainly for card games like poker, black jack, etc. For some of these betting and casino games, dice are necessary but the players often do not trust the automated dice results coming from computer systems. They would feel more comfortable if they had control over the throwing aspect of the game.

Methods to read and digitalize dice results have been described in US patent application 2014/0159308A1, international patent application WO02/066926A1 and U.S. Pat. No. 7,360,762B2 among others.

These methods however require specially produced dice, either fitted with sensors, e.g. as is the case with US2014/0159308A1, or the faces of the dice equipped with a magnetic or isolating layer, e.g. as is the case with WO02/066926A1.

Another method is provided in U.S. Pat. No. 7,360,762B2, wherein it is described using an image capturing section to register an image of the thrown dice. The image-capturing device either consists of camera placed above the throwing area, or a scanning device located beneath a transparent board. Said method has to its disadvantage that it either requires a construction upon the throwing field, obscuring part of the throwing field for onlookers at a certain angle and by using a camera that needs to be precisely positioned in order to cover every angle of the throwing field. Alternatively when using a scanning device beneath a transparent board, said scanning device being a regular scanning device with movable parts, readout of the dice cannot be done in real-time. Additionally this setup results in a rather thick device, not practical for throwing dice and body ergonomics.

SUMMARY OF THE INVENTION

It is an object of the present invention to provide a device adapted for dice recognition in real time. It is an advantage of embodiments of the present invention that it is possible to read instantly the results of the dice, because the dice are thrown on a realtime scanner, e.g. a realtime flatbed scanner.

It is an advantage of embodiments of the present invention that recognition of one or more dices can be done within a specific timeframe after the dice have come to a standstill, reducing the chance of the dice being manipulated with.

It is an advantage of embodiments of the present invention that systems are provided that are less sensitive to counterfeiting of the dices used, e.g. to altering the shape of the dices to get preferential results.

It is an advantage of embodiments of the present invention that depending on the type of game, e.g. family playing, friends playing, commercial coins betting or semi-professional casino money betting, more verification measures can be incorporated in the dice scanning device, referred to as DSD.

It is an advantage of embodiments of the present invention that the scanning device does not operate based on a scanner head, since this would result in a time lag that could allow players to manipulate and falsify the dice results.

The above objective is accomplished by a method and device according to the present invention.

The present invention relates to a device for assisting in electronic gaming, the device comprising a flatbed scanning device comprising a scanning surface, wherein the scanning surface is arranged for throwing a die or dice thereon, the flatbed scanning device being configured for scanning instantaneously an image of the scanning surface, and a processor configured for receiving scanning information regarding the image of the scanning surface upon which a die or dice are thrown and programmed for deriving, based on said image, data regarding the dice thrown.

The processor may be programmed for recognizing, for at least one die, the shape or size of the die surface facing the scanning surface and for determining the number of eyes within the die surface scanned and outputting the number of eyes as data regarding the die thrown.

The processor may be programmed for recognizing a shape for at least one dice, for comparing the shape with a predetermined shape, and for indicating that the throw is invalid, if the shape recognized differs from the predetermined shape. By registering the shape of the die, a first measure is provided against cheating, for example shaving a side of the die, hence giving it a preferred face to fall onto. This surface isn't square anymore and the processing device will send an alert.

The processor may be adapted for determining at least 4 points on a scanned surface of a die for identifying a shape of the die.

The at least 4 points may comprise four points at the outer edge of the scanned surface, the four points being determined as endpoints of the two largest diagonals that can be formed in the shape.

The processor may be adapted for comparing the length of the largest diameters that can be formed and for comparing the length of the sides of the shape formed using the four points.

The scanning device may comprise no moving parts.

The scanning device and the processor may be adapted for imaging the different positions of the die or dice during the throw, so as to determine the dynamic behaviour of the die or dice. It is an advantage of systems according to embodiments of the present invention that the dynamic behaviour of the dice when thrown can be taken into account for decreasing the risk of tampering.

The processor may be adapted for identifying a moment in time corresponding with a standstill of the die or dice after the throw.

The processor may be adapted for gesture recognition. Indeed some flatbed scanning devices have sufficient sensitivity to detect an object moving near the scanner surface. If the processor recognizes the dice touching the scanner surface and if until the complete standstill of the dice the gesture recognition functions detect another object (eg hand, finger or tool) than the throw would be considered as void.

The processor may be adapted for analysing the wavelength of the capture light in the photodetectors of the scanner device. This means that if the dice surface, completely or partially has a special wavelength absorbing or reflecting coating, or if the mass of the dice is using some wavelength absorbing or reflecting compound or coating, this could be used as a security measure to prevent manipulation of the dice.

In the same manner the processor may be adapted to control the wavelength of the emitted light, so that the combination of emitted wavelength and absorbed or reflected wavelength results in a readable or unreadable die.

The processor may be adapted for analysing a sensor incorporated in or attached to the dice scanner device to observe if the dice scanner device is truly horizontally placed. The horizontally sensor (inclinometer) can be using an electrolytic solution, of which 2 will be needed for measuring the axes in each direction. More ideal is the use of a Micro Electro-Mechanical System (MEMS) inclinometer, which measures both axes at once, and provides more accurate measurements. In general, the sensor incorporated or attached to the dice scanner may be any type of inclinometer.

The processor may be adapted for determining the number of eyes thrown based on image data obtained using the scanning device within a predetermined time period after the moment in time corresponding with the standstill of the dice after the throw.

The predetermined time period for obtaining the image data may be between 10 ms and 350 ms after standstill of the dice after the throw.

The processor may be adapted for recording the number of dice used.

The processor may be adapted for encrypting the data based on a unique number identifying the device for assisting in electronic gaming.

The device furthermore may comprise a plurality of cameras configured for taking a visual image of the dice under different angles for providing visual cross-referencing data.

The device may be equipped with a light curtain producing means, and the processor may be adapted for declaring the throw void if a light curtain produced by the light curtain producing means is disrupted after the die or dice have first passed the light curtain when throwing the die or dice.

The device may comprise a reading device for reading a unique serial number for the die or dice and/or for reading a variable throwing code of the die or dice.

The device furthermore may comprise a writing device for writing the variable throwing code to a writable memory of the die or dice.

The processor may be adapted for determining the velocity of the die or dice and comparing the determined velocity with a predetermined value range for the velocity.

The processor and/or reading device may be adapted for detecting the die or dice at a specific wavelength, the wavelength corresponding with a reflection wavelength, emission wavelength or fluorescence wavelength of a component of or coating on the die or dice.

The device may comprise a processor programmed for performing communication in electronic gaming in client-server mode.

The device may comprise a processor programmed for performing communication in electronic gaming based on a blockchain principle.

The device may comprise an upstanding wall being pressure sensitive for detecting whether or not a die or dice are thrown against the upstanding wall.

The processor may be adapted for using a sensing at the sensitive surface of the upstanding wall for determining the trajectory of a die or dice.

The present invention also relates to a set of components, the set comprising a device for assisting in electronic gaming as described above as well as a die or set of dice comprising a unique serial number and or a variable, writing memory for writing a throwing code therein. The die or set of dice may be coated with a fluorescent or reflective ink or coating or the die or set of dice may comprise a fluorescent or reflective component. The die or set of dice may be coated with an anti-slip coating or the die or set of dice may comprise a material possessing anti-slip properties.

The present invention also relates to a method for assisting in electronic gaming, the method comprising scanning instantaneously an image of the scanning surface when a die or dice are thrown thereon, and receiving in a processing unit said scanning information regarding the image of the scanning surface upon which a die or dice are thrown and deriving, based on said image, data regarding the dice thrown.

The method may comprise communicating in electronic gaming via a client-server mode. The method may comprise communicating in electronic gaming based on a blockchain principle.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
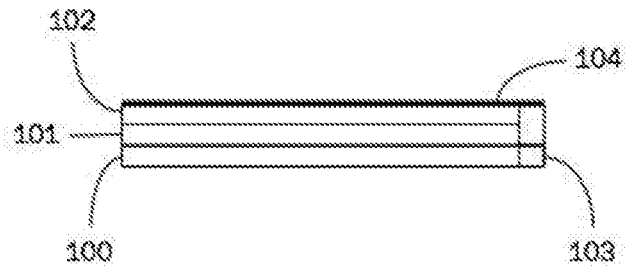
FIG. 1 illustrates a cross-sectional view of a scanner plate construction as can be used in embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to diagonal reference is made to the longest distance that can be obtained by connecting two edge points of a shape, the two edge points not being part of a same straight line.

In a first aspect, the present invention relates to a device for assisting in electronic gaming. The device comprises a flatbed scanning device comprising a scanning surface, wherein the scanning surface is arranged for throwing a die or dice thereon, the flatbed scanning device being configured for scanning instantaneously an image of the scanning surface. The device also comprises a processor configured for receiving scanning information regarding the image of the scanning surface upon which a die or dice are thrown and programmed for deriving, based on said image, data regarding the dice thrown. The device for assisting in electronic gaming thus corresponds with a device that recognizes dice by throwing them on a flatbed scanning device without moving scanning head. As indicated above, the device is equipped with a processing device that receives its input from the scanning device. As will be illustrated below with respect to particular embodiments, other verification sensors can be installed for allowing further verification of the scanning result. The different verification sensors are independent systems and produce verification data.

Advantageously, according to embodiments of the present invention, recognition of the dice is done in real-time and within a specific timeframe after the dice have come to a standstill, reducing the chance of the dice being manipulated with.

According to at least some embodiments, recognition of the dice is done by registering the shape on the scanner surface and by the number of eyes within this shape.

By way of illustration, the present invention not being limited thereto, a number of standard and optional features will now further be discussed with reference to a number of particular examples and particular embodiments of the present invention.

The concept of at least some embodiments of the present invention is making use of a scanning device to read out dice after being thrown on said device. The device will utilise this concept to recognize the dice, and the number of eyes on die-side that is lying on the scanning device surface. Traditional scanning devices utilise moving scanner heads, or require the object to be moved across a static scanning head. The scanning device as envisioned will therefor have no moving scanning head, as the scanning is expected to happen in real-time, according to the invention.

A real time flatbed scanner that can scan a complete area in one step can be used. It is to be noticed that very often, the resolution of the scanner is of less importance for the current application. For the scanning purpose of the present invention, a low resolution of 80 dpi would be very satisfying, probably 40 dpi could be already applicable to read and digitalize the dice points. The eyes of the dice are usually composed of a light-reflecting material, whereas the body of the dice is made of a translucent or light-absorbing material, or vice versa. The high contrast between light-reflecting surfaces and light-absorbing surfaces enables use of monochrome images to determine the shape of the die, and the number of eyes on the die. Being able to use monochrome images, coupled with a low resolution enables the DSD to be made in a cost-effective way.

In embodiments of the present invention, the device comprises a flatbed scanning device. The flatbed scanning device according to embodiments is a scanning device without moving scanning head. A plurality of flatbed scanning devices can be used. Several techniques for scanning without the need for a moving scanning head have been described, i.e. US2015062461 A1, U.S. Pat. No. 7,859,526 B2, US20080158144 A1, US20140036168 A1 & WO2010/002840 A2 among others. In case of U.S. Pat. No. 7,859,526 B2, US20080158144 A1 & US20140036168 A1, the scanning device is part of a display device, therefor using a pixelated light-source. Although this can be used, there is no need for a pixelated light-source since this seems needlessly complicated and exceedingly expensive. WO2010/002840 A2 describes a scanning device making use of a non-pixelated light-source, i.e. an edge coupled fluorescent light, an edge coupled LED, or an organic light emitting diode (OLED). In one example, the scanning device without moving scanning head comprises a matrix array of photo-detectors (101) and a light-source (100/200) as described for example in WO2010/002840 A2.

In one particular set of embodiments, a scanning device as described in US2015062461 A1 can be used. It describes a large area surface scanning technique in a contactless user interface based on transparent electrodes on a transparent substrate, e.g. plastic or glass. These electrodes are made of transparent conductive oxide and are used to form an array of photo-detectors. This array of photo-detectors allows light to pass through the array, which then is reflected or absorbed by an object placed on the surface. A scanning system like this can thus be used in a device for assisting in electronic gaming according to embodiments of the present invention. It also allows for gesture recognition making it possible to discern dice from a player's hand. This will be used to monitor any tampering of the dice after they have been thrown.

One typical component of the flatbed scanning device are the detectors used for capturing data.

The detectors may for example be photo-detectors which may for example be formed by printing techniques on electrodes, also called printed electronics, making for a cost-effective production process. An organic photo detector (OPD) layer is formed which can be deposited on an organic thin film transistor (OTFT) layer.

The scanning device may use any technology of photo-detectors, including active pixel sensors, amorphous silicon (a-Si) p-i-n or n-i-p photo-detectors, charged-coupled detectors (CCDs), organic photo-detectors, or any other device that turns photons into electrical signals.

The photo-detectors may be arranged on top or beneath of the light-source. On top of the photo-detectors or light-sources, typically a transparent protective layer (102) may be applied. This protective layer (e.g. a polycarbonate or glass plate) is equipped with an anti-slip coating or layer (104) to provide sufficient friction to prevent the dice from sliding.

Alternatively—when for example the coating on the scanner surface would reduce the reading efficiency—the dice can be coated with an anti-slip coating, or the dice are made from a material or a mix of materials that possesses anti-slip properties (e.g. a rigid type of elastomer such as for example silicone rubber).

The photo-detectors are uniformly spaced apart at a maximum of 600 microns from one another, forming an array, providing a scanning resolution of at least 40 dpi. This allows for accurately recognizing dice since the size of the eyes on the dice are 2-4 mm.

Another typical component of the flatbed scanning device is the light source used. The light source may be any suitable light source, such as for example a substrate with an edge-coupled fluorescent light, a substrate with edge-coupled LEDs (103) or an organic light-emitting diode (OLED) (200).

According to embodiments of the present invention, the device for assisting in electronic gaming, also referred to as dice scanning device or DSD, is equipped with a processing device (305) that converts the data taken by the scanning device into an output. This processing device may be coupled with a secondary processing device (306) for example a PC, which can display the information received by the first processing device. Alternatively, when the first processing device detects unwanted manipulation of the dice, it sends an alert signal to the secondary processing device. In yet another alternative all processing and outputting is done in a single processing device. Nevertheless, if a separate second processing device is used, this can be positioned on a separate physical position. The connection between the 2 processing devices can be wireless or wired, the encrypted data being communicated through Bluetooth, FireWire, USB or any other protocol used for data communication. The secondary processing device can be, but is not limited to, a personal computer, a smartphone or a tablet. This secondary processing device can be connected to a LAN, WAN or directly to the Internet.

Power supplied to the device can come from an internal or external power supply.

In operation, typically one or more of the following actions may be performed by the system. The system may e.g. be programmed for performing one or more of the below actions.

Before first game of a play series, an initialization cycle can take place, to determine the number of dice used in the game. This can in one example be done by putting the dice on the flatbed scanning device. The flatbed scanning device registers the number of dice placed upon it, and this data is put in the memory, and kept in the memory until switch off. A separate scanning device could also be used for this action. In some examples, where a separate system is present for identifying unique dice, a separate scanning device may be provided performing both the function of identifying unique dice and determining the number of dice, type of dice, . . . used.

The DSD will compare the number of dice used in the game and if this doesn't match the number in memory, the device will send an alert. The number of dice in the DSD memory will be used to confirm the standstill of the dice by checking the amount of dice shape coordination points scanned by the DSD against the number of dice shape coordination points in the memory of the DSD.

During the game following possible actions may be performed.

When the dice are at a standstill a scan will be made in a defined period after standstill; possibly between 10 and 350 ms; minimizing the timeframe in which the dice could be manipulated. The scan is made by emitting light from the light-source, which is reflected or absorbed by objects placed on the scanning device. The array of photo-detectors captures this reflected or absorbed light, compiling an image. This image is sent to the processing device.

For example, a dodecahedron shaped die has 12 sides. These sides are all shaped like a pentagon, with the sum of opposing sides usually equals 13.

With respect to security, different levels could be introduced, although different security measures can be taken alone or in combination as preferred and not merely as indicated below.

In one set of embodiments three levels of security will be provided, each higher level supplementing the lower one. These levels are shown in the following table.

| Basic setup (flat setup) | Level 1 (dice tray) | Level 2 (secured dice tray) |
| --- | --- | --- |
| Number of dice on the scanner<br>Numbers of eyes of each die<br>XY scan coordinates of each die coordination point (e.g. cubic dye = 4 coordination points) | | |
| | Four cameras at preferably dice height capturing pictures at scanning moment, which can be used for visual verification in case of doubt. Data-encryption based on an unique serial number of the scanning device | |
| | | Shape and size of dice<br>Unique dice serial number with expiration date<br>Different invisible to the human eye security measures, e.g. RFID, NFC, coded ink, specific wavelength absorbing or reflecting coatings, or compounds, used on or in the dice. Controlled emitted light wavelength of the light source. A light curtain installed in the top of the dice tray and/or gesture recognition |

In some embodiments, the information on this image is processed in such a way that the data for each die will include:

the number of eyes on the downward facing side of the die, the coordinates of the coordination points of the die.

These coordination points are at least 4 points, e.g. 4 points, that are linked to the surface of the die, depending on the shape of the die. When using perfect cubic dice, the coordination points are set to the corners of the die. When using dice with rounded edges the surface of the die isn't completely square. The coordination points in this case will be the points where the two biggest diagonals possible cross the outer edge of the surface of the die.

These diagonals should be of equal length when the dice are not tampered with. The sides of the die, which may also be determined based on the 4 points, also should be equal. These points or coordinates can thus be used to check the shape of the die, verifying that the die is not tampered with; i.e. "shaved".

During operation, the processing device also determines the number of eyes for each of the dice. It also determines the number of dice used. The processing device may make use of a predetermined algorithm or a neural network.

When using non-regular die, for example an polyhedral dice, another algorithm is used, depending on the type of die. The aforementioned coordinates can be used to determine the type of dice used.

In the basic setup, e.g. home use or a friendly game, only the scanning device and processing device are used to confirm the number of dice, the number of eyes on each die, the XY-coordinates of each die.

Level 1 security could be meant for games where coins are betted. The flatbed scanning device being part of an octagonal (FIG. 4) or circular (FIG. 5) dice tray in which the dice are thrown.

This level supplements the previous aspects and adds data encryption based on a unique serial number of the DSD. It also incorporates 4 cameras, which are preferably placed at the height of the dice and at different angles. Each of the 4 cameras will take a picture at the time when the dice scan is made. These 4 pictures will be send together with the other dice scan data. In case there would be a doubt of the scanning result or possible cheating, these pictures can act as a visual proof.

Level 2 security could be meant for those games where higher betting amounts are used. In this level we build in protective measures using specific dice properties.

Unique dice can be produced by the following methods:
when a casino or gambling site ships new dice, for example on a weekly basis, the dice will have an expiration date linked to the serial number of each die. When the dice are used after the expiration date the computer system will recognize this by the serial number.
the DSD can be equipped with a RFID or NFC reading and writing device. Alternatively in cases where it is not preferable to equip the DSD with such a device, a separate read/write device will be provided with or without separated data communication means. A RFID or NFC tag (702) can be incorporated in the die during the manufacturing process, through injection-moulding for example. This would allow a writing device to write a variable and possibly encrypted "throwing code" into the R/W memory of the dice. When the dice are thrown and read by the scanner, it will read out the serial number of the dice and the encrypted throwing code. The serial number of the die is fixed, the encrypted throwing code is the variable for each throw.

Before throwing the dice the player would need to put the dice on the dice reader/writer and within a defined time period conduct the throw. If the throwing time has elapsed the player would have to put the dice on the writing device again to write a new throwing code into the dice memory.

The fact that casino dice are, casino dependent, perfect cubes with edges of 19 mm will be used to check the shape and size of the dice. Any shape and size of die can be programmed into the device as a new standard.

Level 2 security will make use of the gesture recognizing ability of the scanner surface to prevent players from tampering with the dice after they have been thrown. When it is not preferable or not possible due to circumstances using this ability, instead a light curtain will be incorporated in the top of the dice tray. When throwing the dice into the dice tray, the dice pass the light curtain and hit the throwing surface.

Any further disruption of the light curtain before the scan is made will send an alert and the throw will be considered void.

This light curtain will be positioned at a height at least 175% of the height of the dice used for playing. This enables the dice to roll on the throwing area without disturbing the light curtain. This allows a natural throwing motion to be made without disturbing the light curtain by the player's hand. Similarly with the scanning device gesture recognition function; it detects if a hand, finger or tool is active in the throwing area, trying to manipulate the dice results.

To prevent tilting or nudging the scanner, which can influence the outcome of a throw, an inclinometer (1201) can be used to acknowledge that the scanner is in perfect horizontal position, i.e. parallel to the surface of the earth.

This can be done with a modern inclinometer that uses an electrolytic solution, of which 2 will be needed for measuring the axes in each direction. More ideal is the use of a Micro Electro-Mechanical System (MEMS) inclinometer, which measures both axes at once, and provides more accurate measurements. It is to be noticed that embodiments are not limited to a MEMS or electrolytic inclinometer solution and that other types of inclinometers also can be used.

When the measurement is off by x degrees a signal will be sent and the throw will be considered void.

The unique serial numbers for the dice and the DSD are encrypted by known and tried encryption algorithms e.g. AES encryption.

Asides from the aforementioned security levels, all security measures can be interchanged to offer a customized level of security or to periodically change certain measures, preventing players to get familiar with the security measures and being able to circumvent them.

In another embodiment of the invention, the velocity of the dice is measured from the point of first impact; i.e. the point in time where the DSD registers an initial object on the scanner plate; until the coming to a standstill of the dice; i.e. the point in time of the registration of the die by recognizing the shape of the die. XY-coordinates used for this measurement will be the xy-coordinates that are furthest apart from each other. Depending on the size of the throwing area the velocity of the dice must range between 15 to 90 cm/s. In this embodiment the scanning rate is set at 100 frames per second to facilitate the measurements.

In another embodiment of the invention an algorithm is used to check the trajectory of the dice after being thrown. This trajectory cannot be predicted, as dice will roll differently every time they are thrown. However, certain movements; e.g. the direction of the dice becomes opposite to the direction they were originally thrown in; of the dice cannot happen when throwing dice in a normal, legit way. When these movements take place, an alert is sent and the throw will be declared illegitimate. This is only possible due to the use of a real-time, full surface, scanning device, which is an integral part of the invention.

In another embodiment of the invention the walls of the inner side of the dice tray have been fitted with pressure sensitive fabric as described in for example U.S. Pat. No. 7,365,031 (B2).

In some games, for example craps, players are required to throw the dice against a backstop, i.e. the usually rubberized pyramid-shaped walls of the craps table. This backstop, being pressure sensitive in this embodiment, will register when dice are being thrown against it. Alternatively, when the dice haven't hit the pressure sensitive backstop, the device will send out an alert and consider the throw illegitimate.

In a further embodiment the pressure sensitive walls are used to further follow the trajectory of the dice after being thrown, cancelling out possible false-negatives that can occur when following the trajectory of the dice solely using the real-time, full surface scanning device.

In another embodiment of the invention the separate read/write device will be used in conjunction with the built-in read/write device to provide a further protection layer.

The player will have to put the dice on the separate read/write device before throwing, placing a throwing code in the memory of the die. This throw code is read by the built-in read/write device, and then replaced by a thrown code. Before the next throw, the dice have to be put on the separate read/write device again that reads out the thrown code, and replaces it with a new throw code. When the dice do not have the previous thrown code when placed on the separate read/write device they are considered tampered with and an alert will be sent.

Further by way of illustration, some explicit examples will now be shown, making reference to the drawings attached.

FIG. 1 is a cross-sectional view of the scanner plate construction of an exemplary device according to one embodiment of the present invention. The light source 100 is shown with an edge-coupled LED 103 which emits the light through the array of photo-detectors 101. Protection layer 102 is shown, which may be a film or a plate (e.g. polycarbonate or glass). Coating 104 on the protective layer is shown since whenever the surface of 102 would be very slippery and the dice would not roll but slide. In such a case 104 would be a coating that enhances the surface roughness or grip effect so that the dice will roll on the surface scanner of the scanner plate.

Figure 2A:
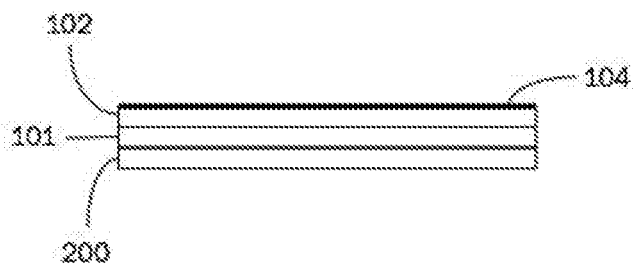
FIGS. 2a and 2b illustrates a cross-sectional view of a system according to embodiments of the present invention, wherein the radiation source is positioned beneath the array of detectors, respectively above the array of detectors.

FIG. 2a is a cross-sectional view of a scanner plate construction according to an embodiment of the present invention. In this embodiment the light-source 200 is an organic light emitting diode (OLED) placed beneath the array of photo-detectors 101. 102 is the protection layer, film or plate. 104 is the coating that enhances the rolling effect of the dice.

Figure 2B:
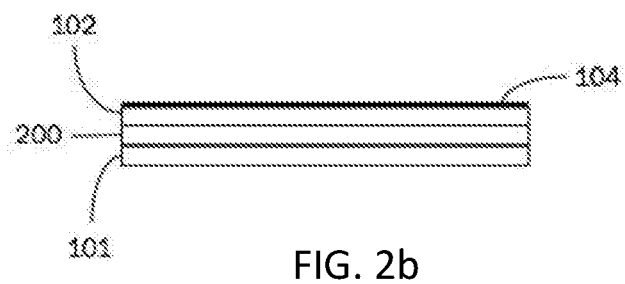

FIG. 2b is another cross-sectional view of another exemplary scanner plate construction. In this embodiment the light-source 200 is placed above the array of photo-detectors 101, 102 is the protection layer, film or plate. 104 is the coating that enhances the rolling effect of the dice.

Figure 3:
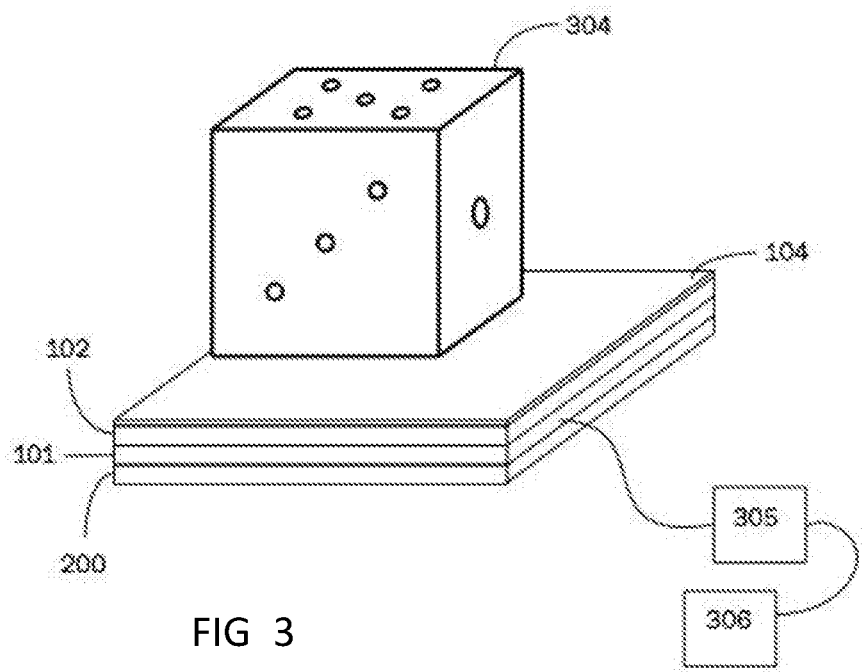
FIG. 3 to 10 illustrate examples of systems according to embodiments of the present invention.

FIG. 3 shows how the die 304 is positioned when it is flat on the surface of the scanner plate construction according to an exemplary embodiment of the present invention. The scanner will read the eyes (dots) of the bottom side of the die the light that is emitted upwards is reflected by the surface of the die, the reflected light will be captured by the array of photo-detectors 101. The array of photo-detectors is connected to the processing device 305 that is coupled to a secondary processing device 306. In this figure the top of the die shows 5 dots, this means that the bottom of the die shows 2 dots, since in regular 6-sided (cubic) dice the sum of the opposite sides always equals 7. Dice have a clear contrast level between the eyes on the die, and the body of the die. Eyes on the die are light-reflecting, whereas the body of the die is translucent or light-absorbing, or vice versa. This contrast makes them perfectly suited to be distinguished by a low-resolution monochrome scanner, since grey scales or colour levels do not matter in the eye of the dice recognition. Contrast is more important.

Figure 4:
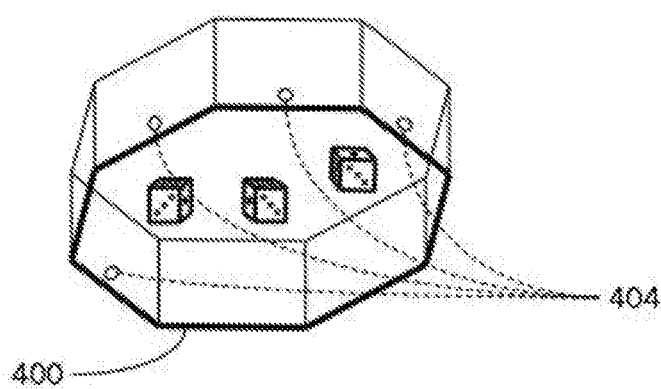

FIG. 4 is a top view of an octagonal dice tray, showing camera sensors 404, as can be part of the device according to an embodiment of the present invention. 400 is the bottom of the tray which is in fact the scanner plate construction. The cameras can be simple black and white (with grey scale) sensors. Because we just have to capture the positions and the surfaces of the dice. Black and white information is substantially smaller than colour picture information and thus faster to process and more compact in data communication.

Figure 5:
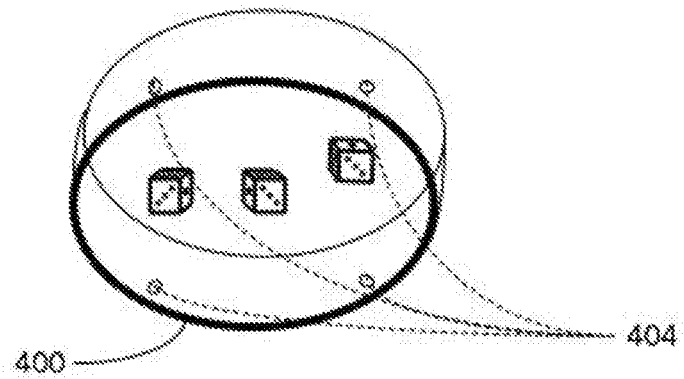

FIG. 5 is a bottom view of a circular dice tray, showing cameras 404 and the dice scanner 400, according to another embodiment of the present invention.

Figure 6:
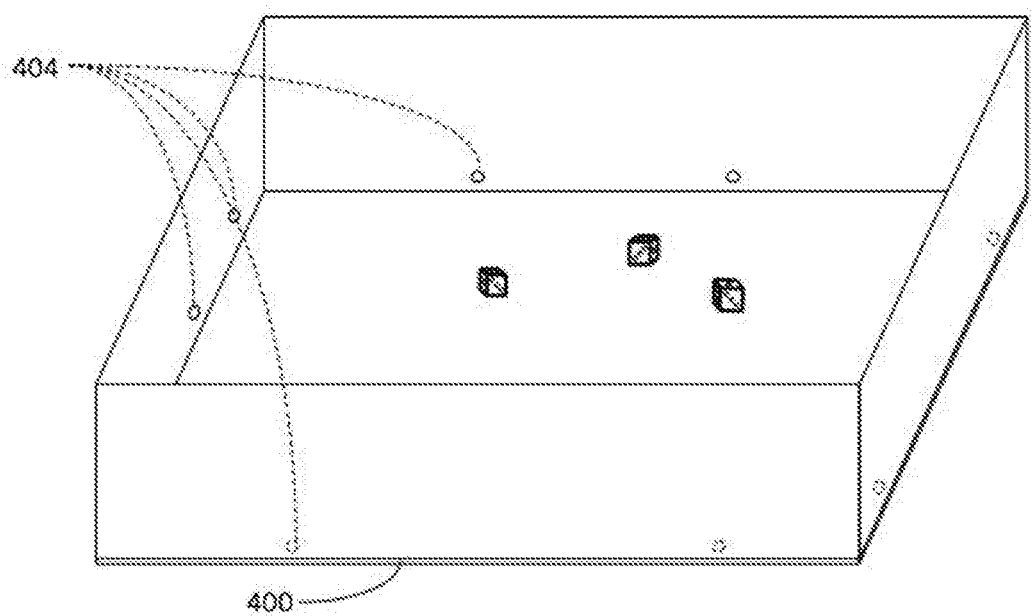

FIG. 6 is another embodiment of the invention. This shows a configuration that could be used at casinos, e.g. in place of or supplementing a craps table. The dice tray is much larger and more cameras 404 are included.

Figure 7:
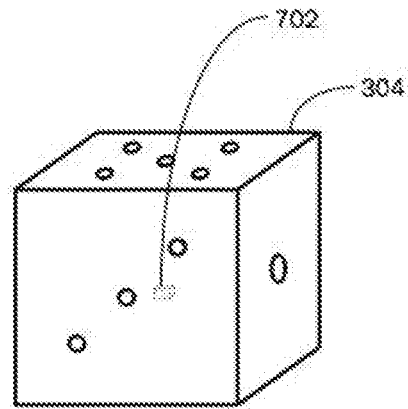

FIG. 7 is a sideways view of a die 304 with an embedded RFID or NFC tag 702, as can be used in embodiments of the present invention.

Figure 8:
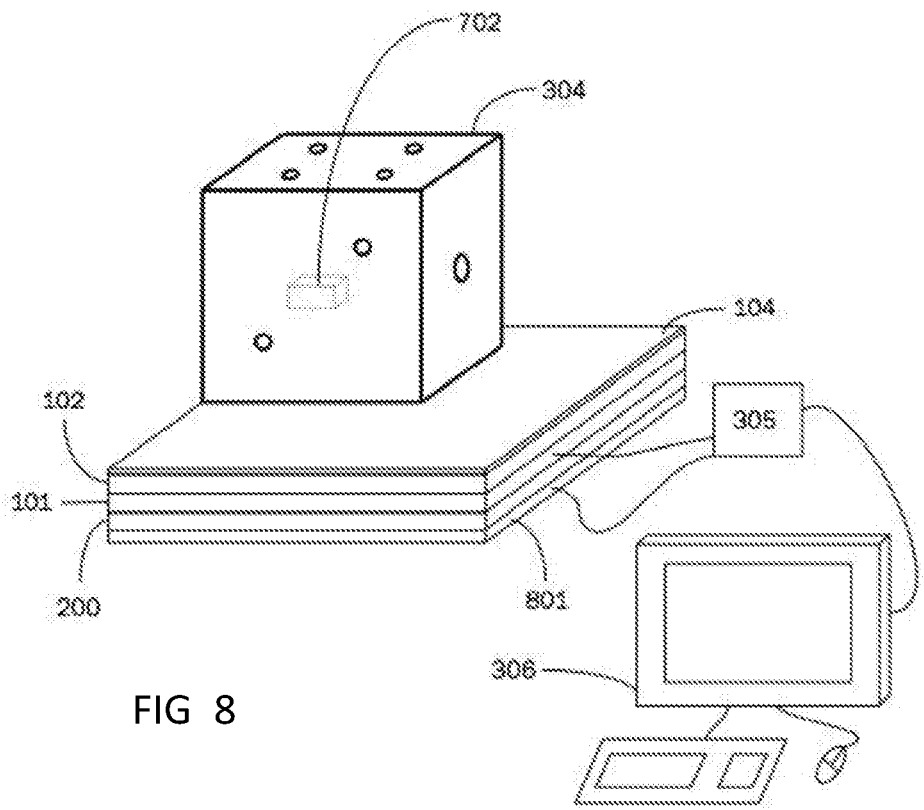

FIG. 8 is a cross-sectional view of the DSD according to an embodiment of the present invention, with an added RFID or NFC antenna layer 801 that is capable of reading and writing the RFID or NFC tag 702 embedded in the die 304. This layer is connected to the processing device 305. The secondary processing device 306 is depicted as a personal computer.

Figure 9:
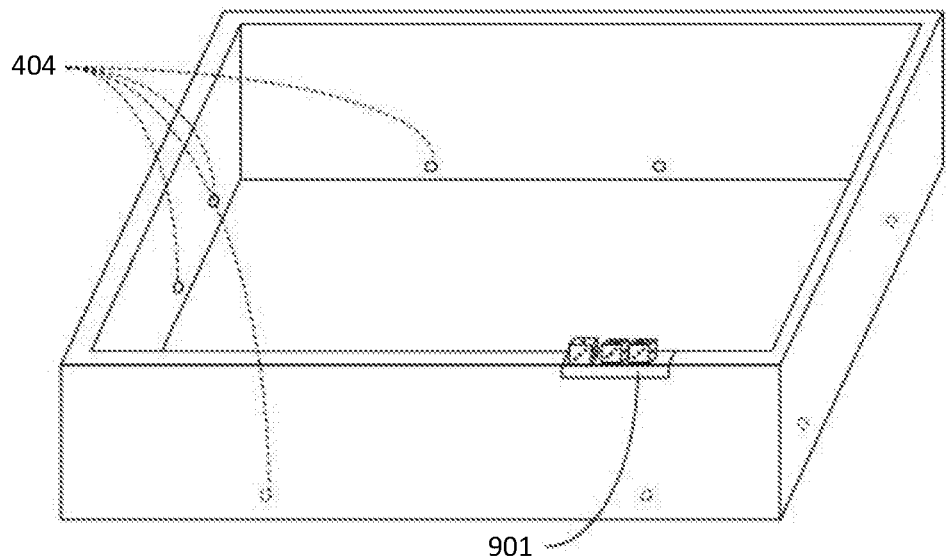

FIG. 9 is a top view of a casino craps table according to another embodiment of the present invention, fitted with a separate RFID or NFC read/write device 901, working in conjunction with the built-in read/write device, preventing players from cloning the data in the memory of the dice.

Figure 10:
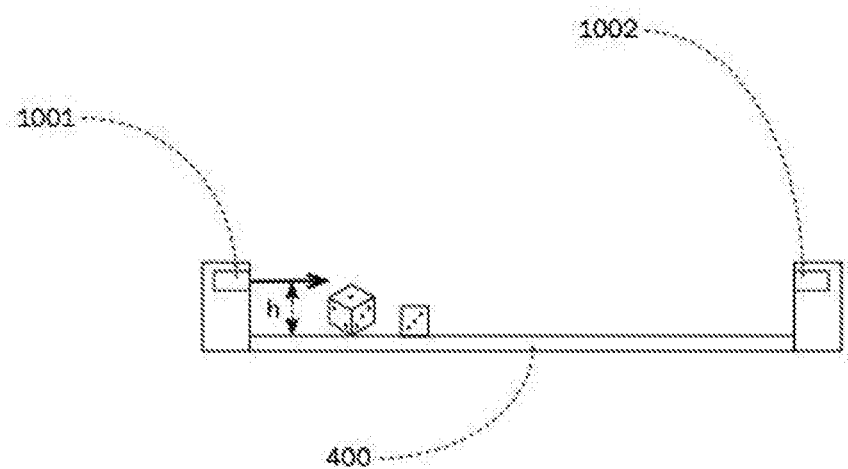

FIG. 10 is a cross-sectional view of a dice tray with an incorporated light curtain, as can be used in embodiments according to the present invention. Light-source 1001 emits a ray of light towards receiver 1002. The light curtain is placed at height h above the scanner surface. This height may be at minimum 175% of the height of a die.

Figure 11A:
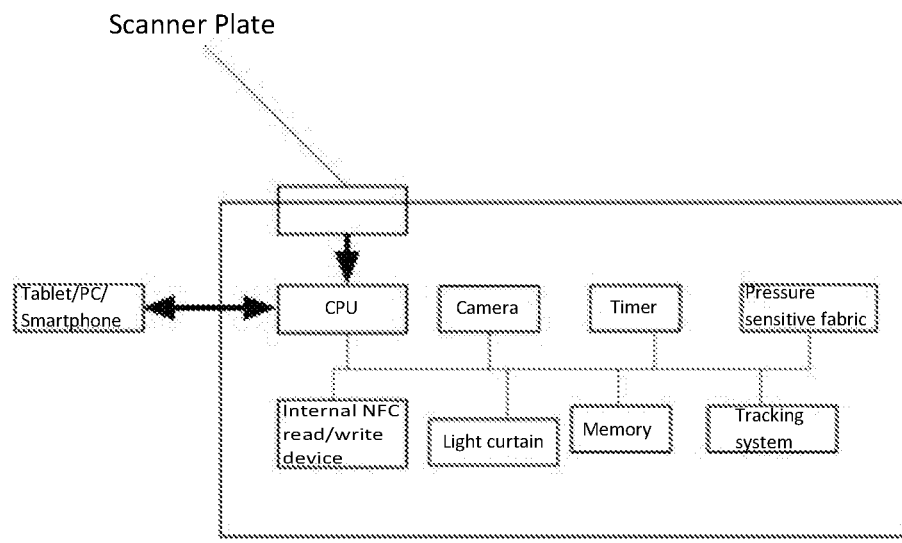
FIGS. 11a and 11b illustrate a schematic diagram of components of two exemplary devices according to embodiments of the present invention.
Figure 11B:
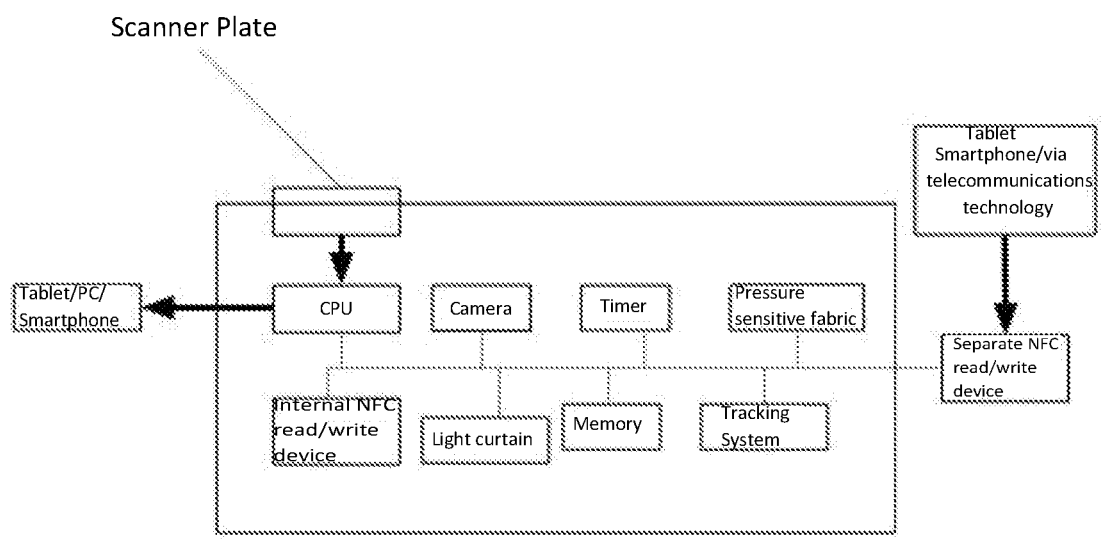

FIG. 11a and FIG. 11b illustrate two possible diagrams of exemplary systems for assisting in electronic gaming, embodiments not being limited thereto. According to FIG. 11a, a system with a flatbed scanning device, a camera, a timer, a pressure sensitive fabric, e.g. at upstanding walls, a tracking system, a memory, a light curtain and internal NFC read/write device is present. These are in direct or indirect communication with a processing unit, e.g. a CPU. The processing unit communicates with a second processing unit, e.g. on a tablet, pc or smartphone.

A similar system is described in FIG. 11b, but there is a separate NFC read/write device is provided, typically used for identifying uniquely defined dice. Such a separate NFC read/write device can also be in communication with a tablet, smartphone or PC.

Figure 12A:
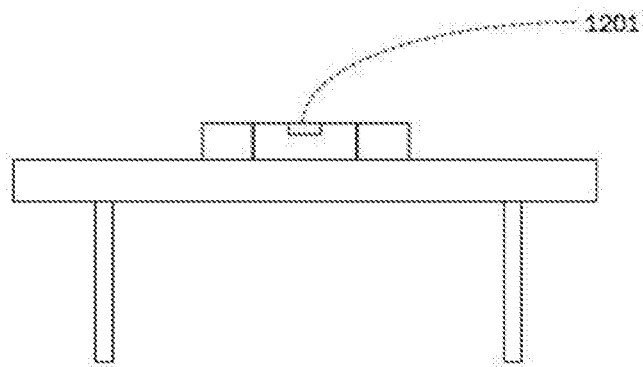
FIG. 12a and FIG. 12b show a front view of an exemplary DSD set on top of a table comprising an inclinometer 1201 for evaluating the alignment of the DSD with a horizontal direction and indicating a validity of a throw, according to an embodiment of the present invention.

FIG. 12a shows a front view of the DSD set on top of a table. Inclinometer 1201 acknowledges that the DSD is aligned with the horizon and sends a signal that regards the throw as legit.

Figure 12B:
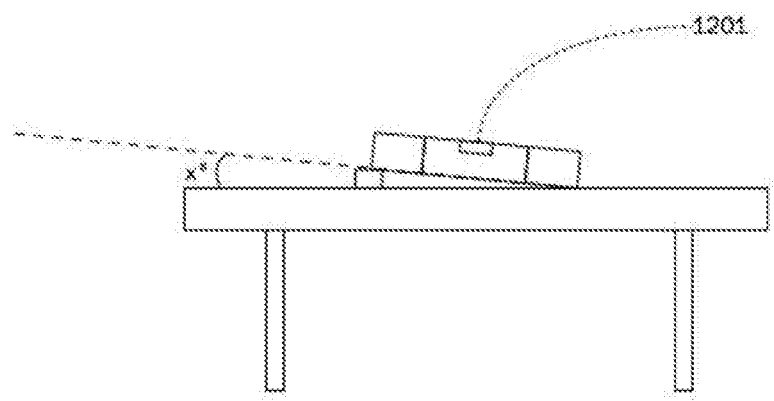

FIG. 12b shows a front view where the DSD set on top of a table, but with an object underneath the DSD to tilt the DSD. The inclinometer 1201 measures an angle of x degrees and sends a signal that the throw is void.

Figure 13A:
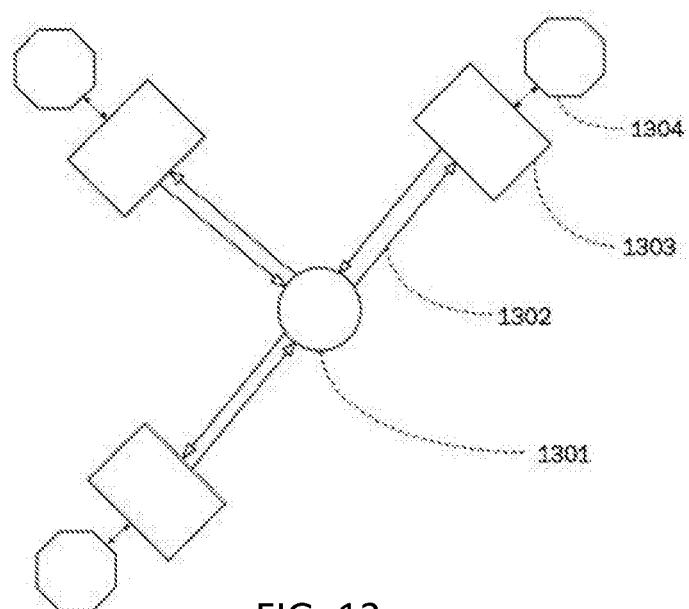
FIG. 13a and FIG. 13b illustrate schematic representations of client-server communication and direct client to client communication, as can be used in embodiments of the present invention.

When playing online, communication between players using the DSD can for example take place using a client-server system. The latter is illustrated in FIG. 13a, where a configuration with three clients and a server is shown. Each client has its own scanning device 1304, its computing device 1303 and a communication channel (wireless or wired) with the server 1301 is established. On the player's computing device such as for example a PC, a smartphone or a tablet 1303, typically software can be installed that operates as a client for communicating with the server. Such a client software thus connects to a server software, e.g. installed on a central server 1301. The software may be programmed so that players have to identify themselves thereby allowing players to play against each other. Identification may occur in a plurality of different ways, e.g. via login and password, via biometric information such as for example an iris scan or fingerprint scan, via reading of an identity card, etc.

When playing a local game, connection between the players can be made on a Local Area Network (LAN), whereby one player will act as the host. This player runs the DSD-client that also acts as a server, while the other players use the DSD-client to log on to the server.

Figure 13B:
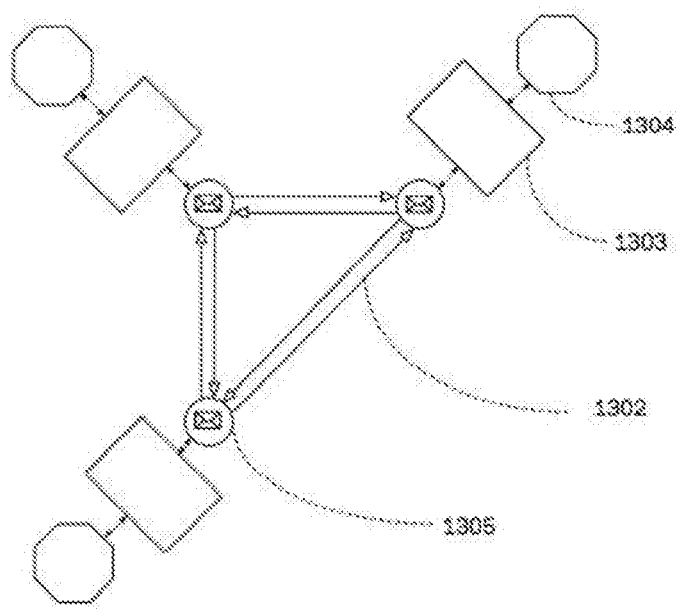

When a server is not wanted, or isn't possible to use, communication between the players can be made in a different way, for example using the players' email addresses. The latter is illustrated in FIG. 13b, wherein a communication between three clients is illustrated based on email clients 1305. The DSD-client connects to the email client 1305 and by using certificates to secure the information, information can be exchanged between the players without the need for having a central server.

All communication between the players, and all information that is exchanged to establish which is the winning throw, and thus the winning player will be secured, using tried and established security measures, e.g. by using a hash function to encode files or other cryptographic methods.

The DSD 1304 itself also makes use of an algorithm to encode all the dice information; number of dice, result of a throw, coordination points of the dice, pictures that are for visual confirmation; and only sends this information when a throw is legit. Whenever a throw is considered void, the only information that is sent is a signal indicating there was an invalid throw.

Embodiments of the present invention may make use of a blockchain. Such a blockchain offers a decentralized method to communicate between players while providing a high level of security. The blockchain acts as a private, distributed or consortium ledger, where every throw of every player is added to. The ledger comprises the unchangeable digitally recorded data in packages. The digitally recorded data in packages, also referred to as blocks, are stored in a linear chain. Each block in the chain contains data, e.g. the results related to a throw, which is cryptographically hashed. Typically, the blocks of hashed data draw upon the previous block in the chain, ensuring all data in the overall blockchain has not been tampered with and remains unchanged. In case of a distributed ledger this ledger is available for the public, a consortium ledger is only accessible between members of a consortium that are authorized to read and/or add to the ledger. The consortium ledger is the preferred manner for use in this application. All the players that are participants to a game gain access to the ledger, as well as the company providing the service in which DSD is used. A private ledger can be used between players when trust between the players is not an issue; e.g. when playing a friendly game locally.

This gives the players a way to make sure that every throw that has been thrown in a game is recorded and, due to the inherent immutability of the ledger; when one would try to change one block in the chain, the whole chain has to be changed accordingly, but when this is checked against the distributed ledger it becomes obvious the chain has been manipulated.

Further features and characteristics of the blockchain principle are described by Nakamoto in his paper titled "Bitcoin: A Peer-To-Peer Electronic Cash System" published on May 24, 2009. (see https://bitcoin.org/bitcoin.pdf). Information like the unique serial code, the coordination points, the throwing code, fingerprint data and/or the result of the di(c)e is hashed and inserted into the block and can then be read out by the players' opponents. Proof-of-work principles are used to process this data.

Based on the above, the device according to embodiments of the present invention thus may comprise a processor programmed for performing communication with other players and/or a server during electronic gaming, e.g. during online gaming. Alternatively, corresponding software may be implemented on a separate computing device used by the user or the server and such software may control the communication between the scanning device of a user on the one hand and a server or computing device of another user.

In one aspect, the present invention also relates to a method for assisting in electronic gaming. The method for assisting in electronic gaming, the method comprises scanning instantaneously an image of the scanning surface when a die or dice are thrown thereon, and receiving in a processing unit said scanning information regarding the image of the scanning surface upon which a die or dice are thrown and deriving, based on said image, data regarding the dice thrown. The method may also comprise one or more or all steps corresponding with the functionality of one or more or all components of a device as described in the first aspect. For example, the method may comprise communicating in electronic gaming via a client-server mode or based on a blockchain principle.

The present invention also relates to a computer program product for, when run on a processor or computing device of the system, performing the method as described above.

The invention claimed is:

1. A device for assisting in electronic gaming, the device comprising:

a scanning device comprising a scanning surface, wherein the scanning surface is arranged for throwing a die or dice thereon, the scanning device being configured for scanning instantaneously an image of the scanning surface, a processor configured for receiving scanning information regarding the image of the scanning surface upon which a die or dice are thrown and programmed for deriving, based on said image, data regarding the dice thrown, the device being adapted with a sensing means for sensing gesture recognition, and the device furthermore being adapted for, upon recognition of a gesture, deciding to declare a throw void.

2. A device according to claim 1, wherein the processor is programmed for recognizing, for at least one die, the shape or size of the die surface facing the scanning surface and for determining the number of eyes within the die surface scanned and outputting the number of eyes as data regarding the die thrown.

3. A device according to claim 2, wherein the processor is adapted for identifying a moment in time corresponding with a standstill of the die or dice after the throw and for determining the number of eyes thrown based on image data obtained using the scanning device within a predetermined time period after the moment in time corresponding with the standstill of the dice after the throw or wherein the processor is adapted for identifying a moment in time corresponding with a standstill of the die or dice after the throw and for determining the number of eyes thrown based on image data obtained using the scanning device within a predetermined time period after the moment in time corresponding with the standstill of the dice after the throw, the predetermined time period for obtaining the image data being between 10 ms and 350 ms after the standstill of the dice after the throw.

4. A device according to claim 1, wherein the processor is programmed for recognizing a shape for at least one dice, for comparing the shape with a predetermined shape, and for indicating that the throw is invalid, if the shape recognized differs from the predetermined shape.

5. A device according to claim 1, wherein the processor is adapted for determining at least 4 points on a scanned surface of a die for identifying a shape of the die.

6. A device according to claim 5, wherein the at least 4 points comprise four points at the outer edge of the scanned surface, the four points being determined as endpoints of the two largest diagonals that can be formed in the shape.

7. A device according to claim 6, wherein the processor is adapted for comparing the length of the largest diameters that can be formed and for comparing the length of the sides of the shape formed using the four points.

8. A device according to claim 1, wherein the scanning device comprises no moving parts or wherein the scanning device and the processor are adapted for imaging the different positions of the die or dice during the throw, so as to determine the dynamic behavior of the die or dice.

9. A device according to claim 8, wherein the processor is adapted for identifying a moment in time corresponding with a standstill of the die or dice after the throw.

10. A device according to claim 1, wherein the processor is adapted for recording the number of dice used or wherein the processor is adapted for encrypting the data based on a unique number identifying the device for assisting in electronic gaming.

11. A device according to claim 1, the device furthermore comprising a plurality of cameras configured for taking a visual image of the dice under different angles for providing visual cross-referencing data, or the device being equipped with a light curtain producing means, and wherein the processor is adapted for declaring the throw void if a light curtain produced by the light curtain producing means is disrupted after the die or dice have first passed the light curtain when throwing the die or dice, or the device being adapted with a sensing means for sensing a horizontal orientation of the device.

12. A device according to claim 1, wherein the device comprises a reading device for reading a unique serial number for the die or dice and/or for reading a variable throwing code of the die or dice or a writing device for writing a variable throwing code of the die or dice to a writable memory of the die or dice.

13. A device according to claim 1, wherein the processor is adapted for determining the velocity of the die or dice and comparing the determined velocity with a predetermined value range for the velocity or wherein the device comprises an upstanding wall being pressure sensitive for detecting whether or not a die or dice are thrown against the upstanding wall.

14. A device according to claim 1, wherein the processor is adapted for using a sensing at the sensitive surface of the upstanding wall for determining the trajectory of a die or dice, or wherein the processor is adapted for detecting the die or dice at a specific wavelength, the wavelength corresponding with a reflection wavelength, emission wavelength or fluorescence wavelength of a component of or coating on the die or dice.

15. A device according to claim 1, the device comprising a processor programmed for performing communication in electronic gaming in a client-server mode or based on a blockchain principle.

16. A device for assisting in electronic gaming, the device comprising:

a scanning device comprising a scanning surface, wherein the scanning surface is arranged for throwing a die or dice thereon, the scanning device being configured for scanning instantaneously an image of the scanning surface, a processor configured for receiving scanning information regarding the image of the scanning surface upon which a die or dice are thrown and programmed for deriving, based on said image, data regarding the dice thrown, the device being adapted with a sensing means for sensing a horizontal orientation of the device, wherein the sensing means for sensing a horizontal orientation is an inclinometer integrated or directly or indirectly attached to the scanning device.

17. A set of components, the set comprising:

a device for assisting in electronic gaming, the device including a scanning device comprising a scanning surface, wherein the scanning surface is arranged for throwing a die or dice thereon, the scanning device being configured for scanning instantaneously an image of the scanning surface, a processor configured for receiving scanning information regarding the image of the scanning surface upon which a die or dice are thrown and programmed for deriving, based on said image, data regarding the dice thrown, the device being adapted with a sensing means for sensing gesture recognition and the device furthermore being adapted for, upon recognition of a gesture, deciding to declare a throw void, or the device being adapted with a sensing means for sensing a horizontal orientation of the device, wherein the sensing means for sensing a horizontal orientation is an inclinometer integrated or directly or indirectly attached to the flatbed scanning device, the set of components further comprising a die or set of dice comprising a unique serial number and/or a variable, writing memory for writing a throwing code therein.

18. A set of components according to claim 17, wherein the die or set of dice is coated with a fluorescent or reflective ink or coating or wherein the die or set of dice comprises a fluorescent or reflective component, or wherein the die or set of dice is coated with an anti-slip coating or wherein the die or set of dice comprises a material possessing anti-slip properties.

19. A method for assisting in electronic gaming, the method comprising:

providing a system for assisting in the electronic gaming, the system including a scanning device and a processing unit, the scanning device including a scanning surface, the scanning surface being arranged for throwing a die or dice thereon, scanning instantaneously with the scanning device an image of the scanning surface when a die or dice are thrown thereon, receiving in the processing unit scanning information regarding the image of the scanning surface upon which the die or dice are thrown, the scanning information being output from the scanning device, and deriving, based on said image, data regarding the dice thrown, and sensing and recognizing a gesture with a sensing means for sensing gesture recognition, and upon recognizing the gesture, deciding to declare a throw void or sensing a horizontal orientation of the scanning device, wherein the horizontal orientation of the scanning device is sensed with an inclinometer integrated or directly or indirectly attached to the scanning device.

20. A method according to claim 19, wherein the method comprises communicating in electronic gaming via a client-server mode or based on a blockchain principle.

* * * * *